(12) United States Patent
Hirabayashi et al.

(10) Patent No.: US 8,139,164 B2
(45) Date of Patent: Mar. 20, 2012

(54) USING A/V DEVICE TO SEND CONTROLLED DEVICE COMMUNICATION-RELATED PARAMETERS TO PROGRAM REMOTE CONTROL

(75) Inventors: Yoshi Hirabayashi, San Diego, CA (US); Peter Shintani, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 890 days.

(21) Appl. No.: 12/190,034

(22) Filed: Aug. 12, 2008

(65) Prior Publication Data

US 2010/0039307 A1   Feb. 18, 2010

(51) Int. Cl.
*H04N 5/44* (2006.01)
(52) U.S. Cl. ........................................ 348/734
(58) Field of Classification Search ............ 348/734
See application file for complete search history.

(56) References Cited

U.S. PATENT DOCUMENTS

| | | | |
|---|---|---|---|
| 6,005,490 A | 12/1999 | Higashihara et al. | |
| 6,133,847 A | 10/2000 | Yang et al. | |
| 6,407,779 B1 | 6/2002 | Herz et al. | |
| 6,784,872 B1 | 8/2004 | Matsui et al. | |
| 7,907,222 B2 * | 3/2011 | Haughawout et al. | 348/734 |
| 2003/0107684 A1 | 6/2003 | Chang et al. | |
| 2006/0041655 A1 | 2/2006 | Holloway et al. | |
| 2009/0245804 A1 * | 10/2009 | Garner et al. | 398/106 |

FOREIGN PATENT DOCUMENTS

| | | |
|---|---|---|
| JP | 2004-229307 | 8/2004 |
| JP | 2006-203831 | 8/2006 |
| KR | 10-2006-0117389 | 11/2006 |

OTHER PUBLICATIONS

Takuo Osaki, Tomohiro Haraikawa, Tadashi Sakamoto, Tomohiro Hase, Atsushi Togashi, "An Agent-Based Bidirectional Intelligent Remote Controller", IEEE Transactions on Consumer Electronics, vol. 47, No. 3, Aug. 2001.

* cited by examiner

*Primary Examiner* — Robert L. Deberadinis
(74) *Attorney, Agent, or Firm* — John L. Rogitz

(57) ABSTRACT

An A/V device such as a TV presents a series of GUIs that a user can navigate through using a programmable bidirectional remote control to select a type of component to be controlled, the manufacturer, and model number. Once the desired component is selected by navigating through the GUIs, the TV sends back the necessary code information to enable the remote control to communicate with the component.

13 Claims, 2 Drawing Sheets

USING A/V DEVICE TO SEND CONTROLLED DEVICE COMMUNICATION-RELATED PARAMETERS TO PROGRAM REMOTE CONTROL

FIELD OF THE INVENTION

The present invention relates generally to programming controlled device communication-related parameters into a remote control using an audio-video device such as a TV.

BACKGROUND OF THE INVENTION

Programmable remote controls have been provided for controlling more than one device. Such remote controls typically include mode buttons each of which corresponds to a component to be controlled, e.g., "TV", "disk player", "personal video record (PVR)", etc. When a mode button is toggled by a user the remote control switches its command set, including communication codes, accordingly to correspond to the controlled features of the selected component.

Users must manually key in communication-related parameters and more particularly the communication codes associated with the components intended to be remotely controlled. This is necessary so that the remote control can generate command signals that are understood by the device to be controlled. But requiring users to manual key in codes is cumbersome, time-consuming, and can be confusing since the user typically does not receive feedback of whether the code was entered correctly until trying (and failing or not) to control the relevant component.

SUMMARY OF THE INVENTION

An audio-video (A/V) device is configured to present, in response to navigation signals wirelessly received from a remote control, a series of graphical user interfaces (GUIs) through which a user can navigate to select a component to be controlled. The A/V device in response transmits to the remote control communication-related information to enable the remote control to communicate with the component.

The A/V device can be a TV. In non-limiting embodiments the GUI may enable a user to select a type of component, a manufacturer of the component, a model of the component.

In another aspect, a remote control (RC) has a portable housing, a wireless bidirectional transceiver in the housing, a computer readable storage medium in the housing, and a processor in the housing configured to communicate with the transceiver and storage medium to execute logic. The logic includes receiving, from an A/V device via the transceiver, code information for communicating command signals to a component to be controlled. The logic also includes storing the code information on the storage medium and using the code information to control the component in response to user input on the RC.

In still another aspect, a method includes establishing a bidirectional link between a remote control (RC) and an audio/video (A/V) device, and using the link to allow a user of the RC to invoke graphical user interface (GUI) on the A/V device. The method also includes allowing a user to select a component from the GUI using the RC. Communication-related information pertaining to the component is sent from the A/V device over the link to the RC.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
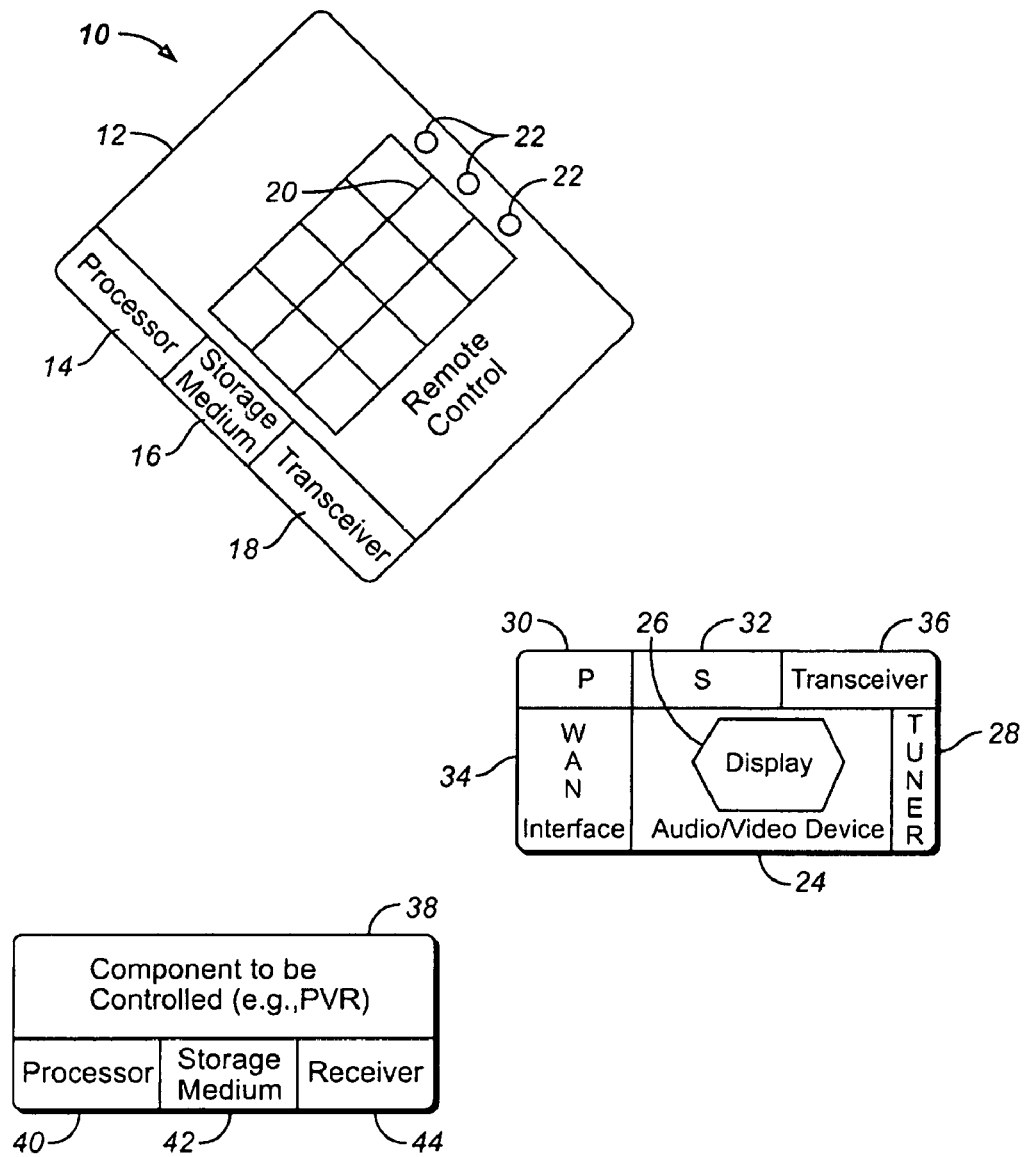
FIG. 1 is a block diagram of an example system in accordance with present principles.

Referring initially to FIG. 1, a remote control 10 includes a portable hand-held housing 12 holding a processor 14 and tangible computer readable storage medium 16 such as but not limited to disk storage, solid state storage, etc. The storage medium 16 can bear data such as but not limited to component communication codes, as well as logic executable by the processor 14 pursuant to logic set forth herein.

The processor 14 communicates with a wireless transceiver 18 within the housing 12 to send and receive wireless signals. The transceiver 18 may be, e.g., an infrared transceiver, a radio frequency transceiver, an ultrasonic transceiver, or any combination thereof, etc. The processor 14 may receive input from a user-manipulable keypad 20 and from one or more mode buttons 22, each of which represents a particular controlled component type, e.g., PVR, disk player, music player, TV, etc.

The remote control 10 can communicate, using the transceiver 18, with an audio video (A/V) device 24 having a video display 26 such as a cathode ray tube, a flat panel display, either standard definition or high definition, etc. The A/V device 24 may be embodied by a TV in which case it may include a tuner 28 for receiving TV programming that is presented on the display 26. A TV processor 30 can communicate with various components within the A/V device 24 including a tangible computer readable storage medium 32 such as but not limited to disk storage, solid state storage, etc. The storage medium 32 can bear data such as but not limited to component communication codes, as well as logic executable by the processor 14 pursuant to logic set forth herein. The codes can be loaded into the medium 32 during manufacture and, if desired, periodically updated from a network such as the Internet by receiving updates through a wide area network (WAN) interface 34 such as but not limited to a modem.

The TV processor 30 may also communicate with a wireless transceiver 36 that is within the A/V device 24 and that is configured complementarily to the transceiver 18 of the remote control 10. In this way, communication codes for controlling one or more components 38 to be controlled may be sent from the A/V device 24 to the remote control 10. The components to be controlled may include but are not limited to PVRs, video disk players and/or recorders, music players, game consoles, etc., and each typically includes a component processor 40 accessing a computer readable storage medium 42 and receiver 44 for receiving commands from the transceiver 18 of the remote control 10.

Figure 2:
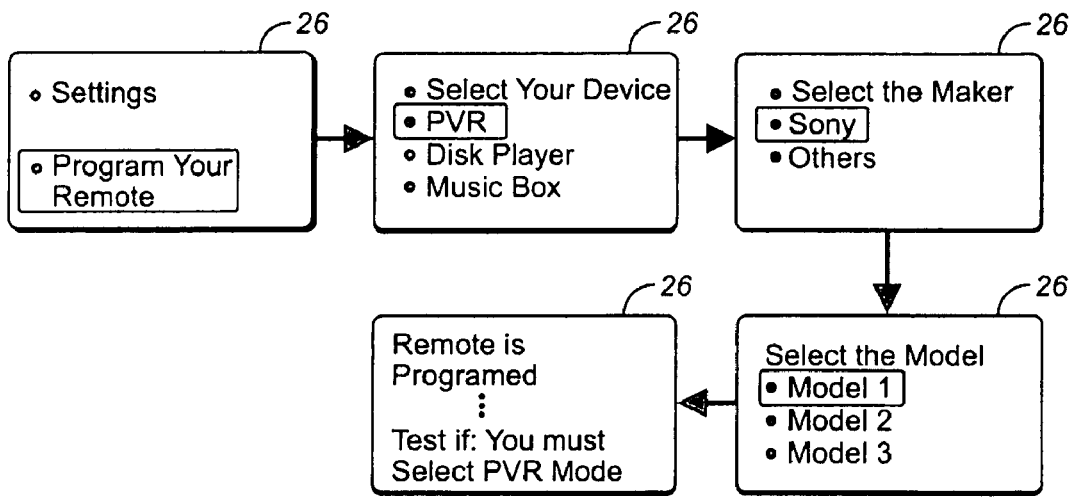
FIG. 2 is a series of non-limiting screen shots on the A/V device illustrating present principles.

FIG. 2 shows a series of screen shots of non-limiting graphical user interfaces (GUIs) that can be presented on the display 26 of the A/V device 24 in accordance with present principles. As shown in the first screen shot, a top level menu may be presented that can list various selections including "settings" (typically to establish various TV settings) and "program your remote" or terms and/or symbols to that effect.

Other top level menu entries may be provided. As shown in the first screen shot, the user has selected "program your remote" using, e.g., navigation keys on the remote control 10 to move a screen cursor and indicate selections.

This causes the TV processor 30 to automatically display the next lower GUI shown in the second screen shot. This GUI may be entitled "select your device", meaning the component the user wishes to program into the remote control, and may list various genres of components as shown.

Assuming for illustration that the user has selected "PVR" in the second screen shot, the TV processor 30 may then automatically display the sub-menu shown in the third screen shot of FIG. 2, in which a list of manufacturers may be presented. Assuming for illustration that "Sony" has been selected, the TV processor 30 may then automatically display the next sub-menu shown in the fourth screen shot of FIG. 2, in which a list of the selected manufacturer's PVR models may be presented.

Figure 3:
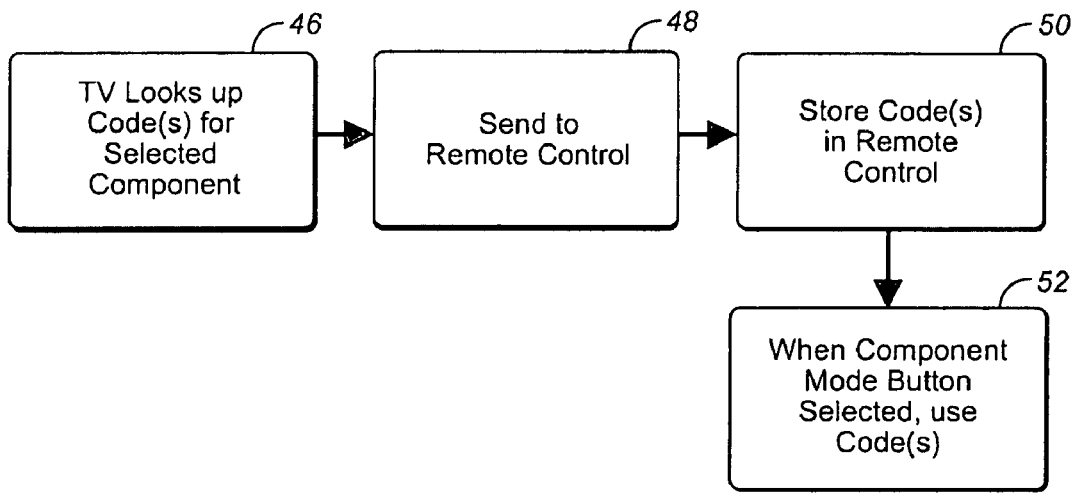
FIG. 3 is a flow chart of some of the non-limiting logic that may be executed in accordance with present principles.

Assuming for illustration that "model 1" has been selected and now referring to FIG. 3, at block 46 the TV processor accesses, e.g., the TV storage medium 32 to look up the communication code(s) associated with the selected component. At block 48 the TV processor 30 then causes the code(s) to be transmitted from the A/V transceiver 36 to the remote control transceiver 18. At block 50 the remote control processor 14 in turn stores the code(s) in the remote control storage medium 16, so that when the relevant mode button 22 is selected to control the component at block 52, the processor 14 accesses the correct code in signalling to the component.

If desired and returning now to FIG. 2, after the code(s) has been sent from the A/V device 24 to the remote control 10, a fifth GUI may be present on the A/V display 26 indicating that the remote control 10 has been successfully programmed. This GUI may be presented in response to an acknowledgement signal from the remote control 10 that a valid code has been received. The GUI may then prompt the user to test the programming by attempting to control the component, e.g., the component 38 shown in FIG. 1. The GUI may also prompt the user to select the correct mode on the remote control 10 as shown. Furthermore, because of the bidirectional communication between the A/V device 24 and the remote control 10, the display 26 can be made to display the actual mode currently selected on the remote control 10.

While the particular USING A/V DEVICE TO SEND CONTROLLED DEVICE COMMUNICATION-RELATED PARAMETERS TO PROGRAM REMOTE CONTROL is herein shown and described in detail, it is to be understood that the subject matter which is encompassed by the present invention is limited only by the claims.

What is claimed is:

1. An audio-video (A/V) device configured to present, in response to navigation signals wirelessly received from a remote control, a series of graphical user interfaces (GUIs) through which a user can navigate to select a component to be controlled, the A/V device in response transmitting to the remote control communication-related information to enable the remote control to communicate with the component, the GUIs including:
    a first GUI enabling a user to select a type of component;
    responsive to selection of a type of component from the first GUI, a second GUI listing plural manufacturers of the type of component;
    responsive to selection of a manufacturer from the second GUI, a third GUI presenting a list of models supplied by the manufacturer selected from the second GUI, a user being able to select a model from the list on the third GUI to cause the A/V device to transmit the remote control-communication-related information.

2. The A/V device of claim 1, wherein the A/V device is a TV.

3. The A/V device of claim 1, wherein the GUIs are presented on a video display.

4. A remote control (RC) comprising:
    a portable housing;
    a wireless bidirectional transceiver in the housing;
    a computer readable storage medium in the housing; and
    a processor in the housing configured to communicate with the transceiver and storage medium to execute logic comprising:
    receiving, from an A/V device via the transceiver, code information for communicating command signals to a component to be controlled;
    storing the code information on the storage medium; and
    using the code information to control the component in response to user input on the RC, wherein the RC navigates through a first GUI to enable a user to select a type of component from the first GUI, the RC responsive to selection of a type of component from the first GUI, enabling a user to navigate a second GUI listing plural manufacturers of the type of component, the RC responsive to selection of a manufacturer from the second GUI enabling a user to navigate a third GUI presenting a list of models supplied by the manufacturer selected from the second GUI, a user being able to select a model from the list on the third GUI to cause the A/V device to transmit the code information to the RC.

5. The RC of claim 4, wherein the transceiver is an infrared transceiver.

6. The RC of claim 4, wherein the transceiver is a radio frequency transceiver.

7. The RC of claim 4, wherein the transceiver is an ultrasonic transceiver.

8. Method comprising:
    establishing a bidirectional link between a remote control (RC) and an audio/video (A/V) device;
    using the link to allow a user of the RC to invoke graphical user interface (GUI) on the A/V device;
    allowing a user to select a component from the GUI using the RC;
    sending from the A/V device communication-related information pertaining to the component over the link to the RC; and
    presenting on the A/V device both a prompt for a user to select a mode on the RC and an indication of a mode actually currently selected on the RC.

9. The method of claim 8, comprising receiving at the A/V device updates to the communication-related information from a wide area network.

10. The method of claim 8, comprising automatically associating, at the RC, the communication-related information with at least one mode selector on the RC.

11. The method of claim 10, wherein in response to selection of the mode selector, the communication-related information is used to send command signals to the component.

12. The method of claim 8, wherein the A/V component is a TV.

13. The method of claim 8, wherein the link is wireless.

* * * * *